P. Ulmer,
Knife, Fork and Spoon.
N° 34,338. Patented Feb. 4, 1862.
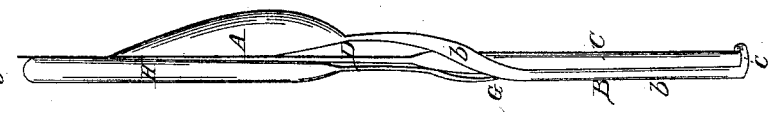
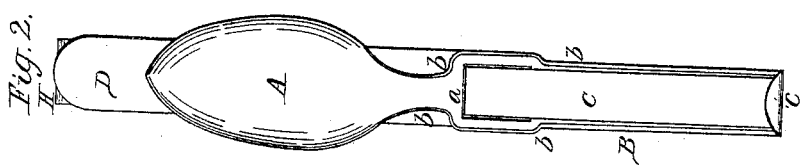
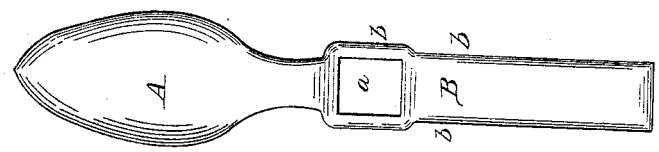
Witnesses
J. S. ...
Jos. O. Ely
Inventor:
Philip Ulmer

UNITED STATES PATENT OFFICE.

PHILIP ULMER, OF PHILADELPHIA, PENNSYLVANIA, ASSIGNOR TO HIMSELF, L. H. WORMAN, AND JOS. O. ELY.

IMPROVED CAMP-SPOON.

Specification forming part of Letters Patent No. 34,338, dated February 4, 1862.

*To all whom it may concern:*

Be it known that I, PHILIP ULMER, of Philadelphia, in the county of Philadelphia and State of Pennsylvania, have invented a new and Improved Camp-Spoon so as to Case with a Knife and Fork; and I do hereby declare that the following is a full and exact description thereof, reference being had to the accompanying drawings, making part of this specification.

Figure 1 is a top view of the spoon; Fig. 2, a bottom view thereof, having a knife and fork cased with it; Fig. 3, an edge view of all cased together.

Like letters designate corresponding parts in all the figures.

The spoon is made of a single piece of sheet metal—say of "sheet-tin" or sheet-iron. The bowl A is of the ordinary size and shape, and it is in the handle B that the novelty consists. First, in the bend of the handle is an aperture $a$ of just width enough to admit the handle C of a knife and of just sufficient depth to receive the thickness of said knife-handle, together with the tines G of a fork. The remaining straight part of the spoon-handle has its edges turned back in flanges $b\ b$ at right angles, so as to form a trough just wide enough to hold the knife-handle C, and the extreme end $c$ thereof is not only turned back, but bent over so as to form a hook to hold the end of the knife-handle C in place. The flanges $b\ b$, turned back, are continued along the edges of the bent portion of the spoon-handle around the aperture $a$ to the bowl, and as the handle requires more strengthening where this aperture is, the flanges may be wider there. The handle may also be widened in the same place, as shown in the drawings. The shape thus given to the spoon is made rapidly with a suitable die at the same time that the bowl is formed. Thus formed the spoon is not only as convenient as any for use, but serves as a case for packing a knife and fork with it. The knife-handle C is first inserted endwise through the aperture $a$ as far as it will go, the blade D resting against the bowl of the spoon. The tines G of the fork are then inserted over the knife-handle through the aperture $a$, the handle H resting against the blade of the knife, and the curved form of the tines allowing sufficient elasticity to hold all tightly and compactly.

The spoon is of course to be adapted to a particular size of knife and fork. I intend to use it more particularly in connection with the improved knife and fork for which I make application for Letters Patent simultaneously with the present application.

What I claim as my invention, and desire to secure by Letters Patent, is—

A spoon formed substantially as herein specified, so as to case with a knife and fork, as set forth.

PHILIP ULMER.

Witnesses:
   J. S. BROWN,
   E. EVANS, Jr.